United States Patent

[11] 3,634,174

[72] Inventor Rubin Warsager
 483 Forest St., Kearny, N.J. 07032
[21] Appl. No. 23,394
[22] Filed Mar. 27, 1970
[45] Patented Jan. 11, 1972

[54] MACHINE FOR SURFACE DECORATING OF ARTICLES
 16 Claims, 5 Drawing Figs.
[52] U.S. Cl.................................................. 156/540,
 156/234, 156/238, 156/361
[51] Int. Cl.......................................................B32b 31/10,
 B65c 3/10
[50] Field of Search........................................... 156/156,
 230, 234, 238, 285, 287, 361, 366, 381, 475,
 540–542; 101/9, 10; 137/624.11

[56] References Cited
UNITED STATES PATENTS

| | | | |
|---|---|---|---|
| 3,309,256 | 3/1967 | Warsager...................... | 156/230 X |
| 2,751,701 | 6/1956 | Grupe........................... | 156/238 X |
| 3,483,063 | 12/1969 | Baines et al................... | 156/542 X |
| 2,981,432 | 4/1961 | Flood............................ | 156/475 |
| 3,231,448 | 1/1966 | Flood............................ | 156/542 |

Primary Examiner—Benjamin A. Borchelt
Assistant Examiner—James M. Hanley
Attorneys—Lewis H. Eslinger, Alvin Sinderbrand and Curtis, Morris & Safford ABSTRACT: A machine for transferring a decorative foil from a carrier tape to an object using pressure and heat in which the object can be round or flat. The machine can be used for moving the object vertically into the die or the die can be moved horizontally across the object.

PATENTED JAN 11 1972 3,634,174
SHEET 1 OF 3
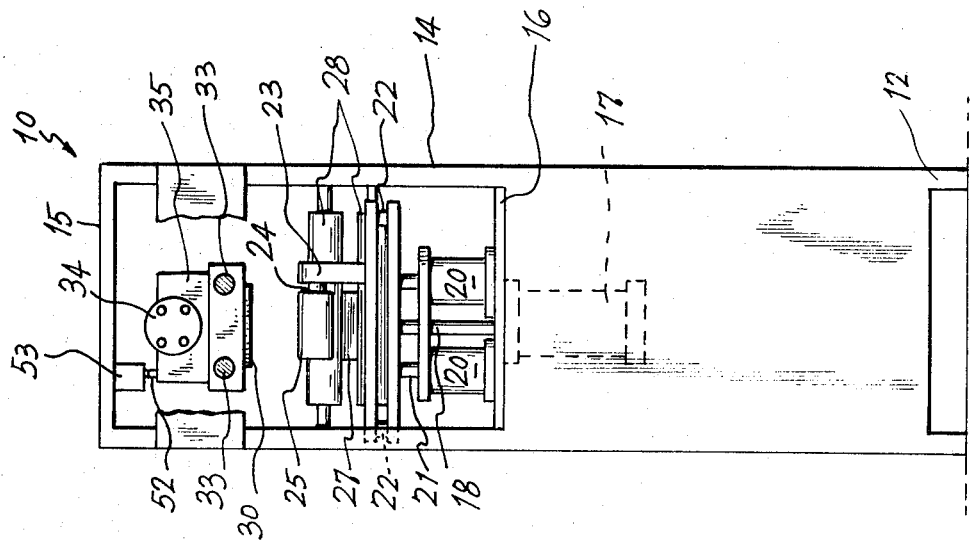
FIG. 2.
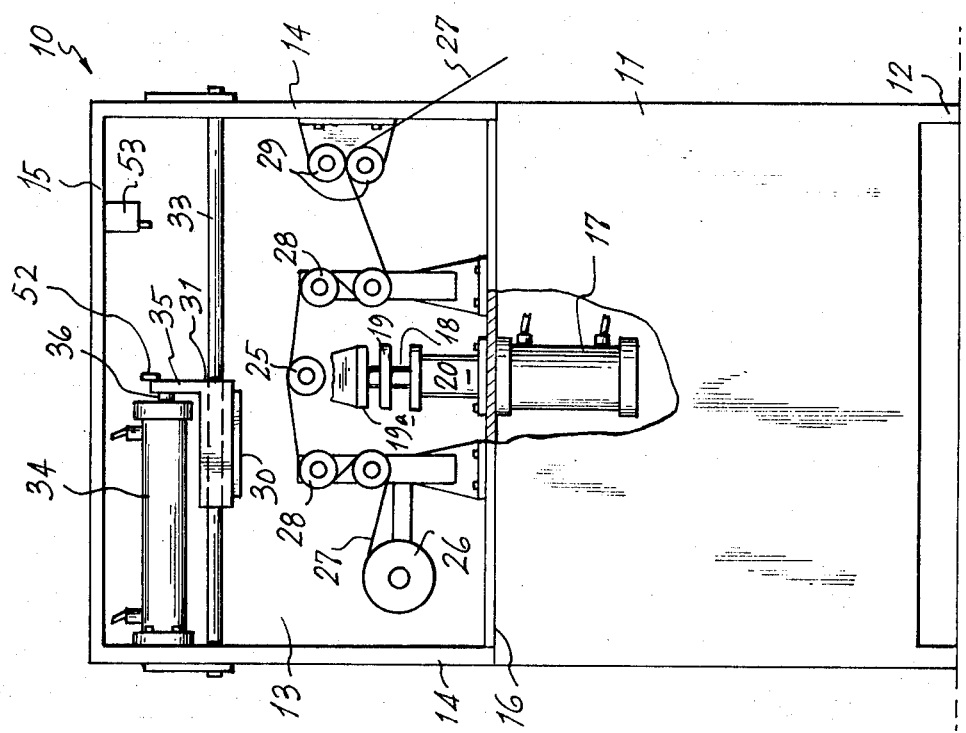
FIG. 1.
INVENTOR.
RUBIN WARSAGER
BY
ATTORNEY

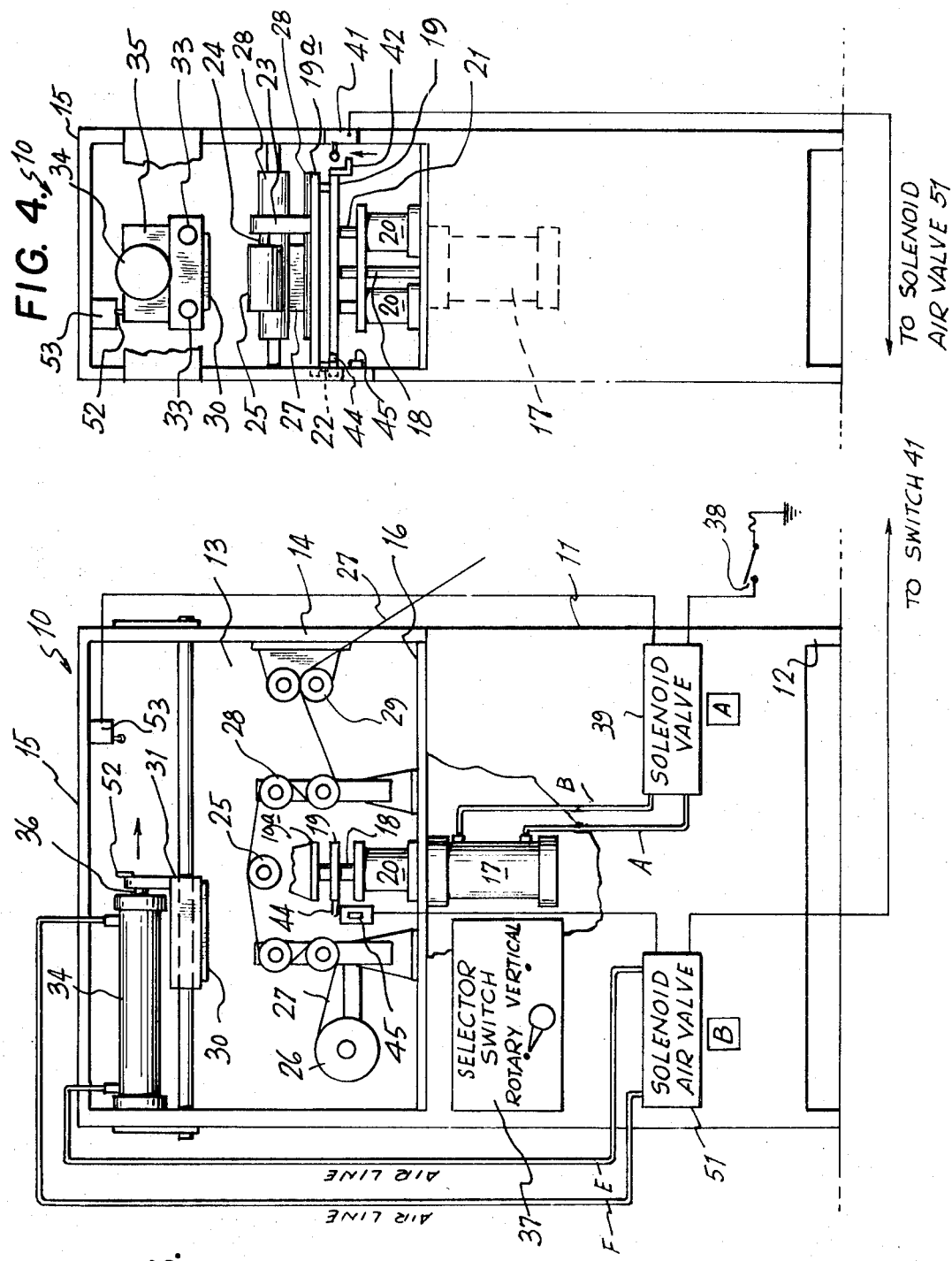

INVENTOR.
RUBIN WARSAGER
BY
ATTORNEY

MACHINE FOR SURFACE DECORATING OF ARTICLES

The present invention relates to a machine for applying a foil-decorative material to an object such as a perfume bottle or a lipstick case. The decoration of such objects is essential to enhance their sales appeal and to impart to the consumers a sense of quality of the product.

The process and the mechanism used to decorate objects generally takes the form of printing or stamping. One of the more successful techniques developed is that of hot stamping. In this process a tape is used to hold the material to be transferred to an object. The tape is generally Mylar which includes a foil, a release material, a web and an adhesive thereon. When heat and pressure are applied to the tape, the release material liquifies and permits the foil to be transferred to an object and the adhesive secures the foil to the object.

A machine that has successfully demonstrated the transfer of foil to an object is shown and described in my U.S. Pat. No. 3,309,256. The patent discloses a circular object to be decorated which is placed on a mandrel. A transfer tape is placed between the object and a heated die. A platform raises the object to the path of travel of a movable die which moves across the object to be decorated as the object rolls on the mandrel. The foil is thereby transferred from the tape to the outer periphery of the object. The aforementioned process works well with objects that are constant in diameter at the area to be decorated. When noncircular objects are to be decorated, however, a new dimension to the problem is introduced, because the object cannot be rotated over a mandrel so as to accomplish a high-quality transfer of foil from the web.

Thus, the art has developed a vertical stamping machine as contrasted to the previously described rotary stamping machine. In the vertical machine, a heated die was moved vertically upon a web located above an object to be decorated and pressure was applied to the web and object by the heated die thereby transferring the decoration to the object and the web was then advanced for the next object.

It is quite costly and it requires a great deal of space in a plant to keep both machines.

It is a principal object of this invention to combine both the rotary and vertical stamping machines into a single machine which can handle the functions of both.

It is another object of the invention to provide a single machine which is less expensive than the cost of a rotary and vertical stamping machine.

It is still another object of this invention to provide a machine which requires less floor space than the vertical and rotary machines.

It is yet another object of the invention to provide in a single machine a rotary and vertical operation in which the machine is relatively uncomplicated and simple to manufacture.

It is another object of the invention to provide a hot stamping machine in which the machine requires few movements by an operator.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a front view of the rotary-vertical stamping machine in accordance with the invention;

FIG. 2 is a side view thereof;

FIG. 3 is a front view of the rotary-vertical stamping machine showing an electrical and pneumatic circuit;

FIG. 4 is a side view thereof;

Figures 5, 6:
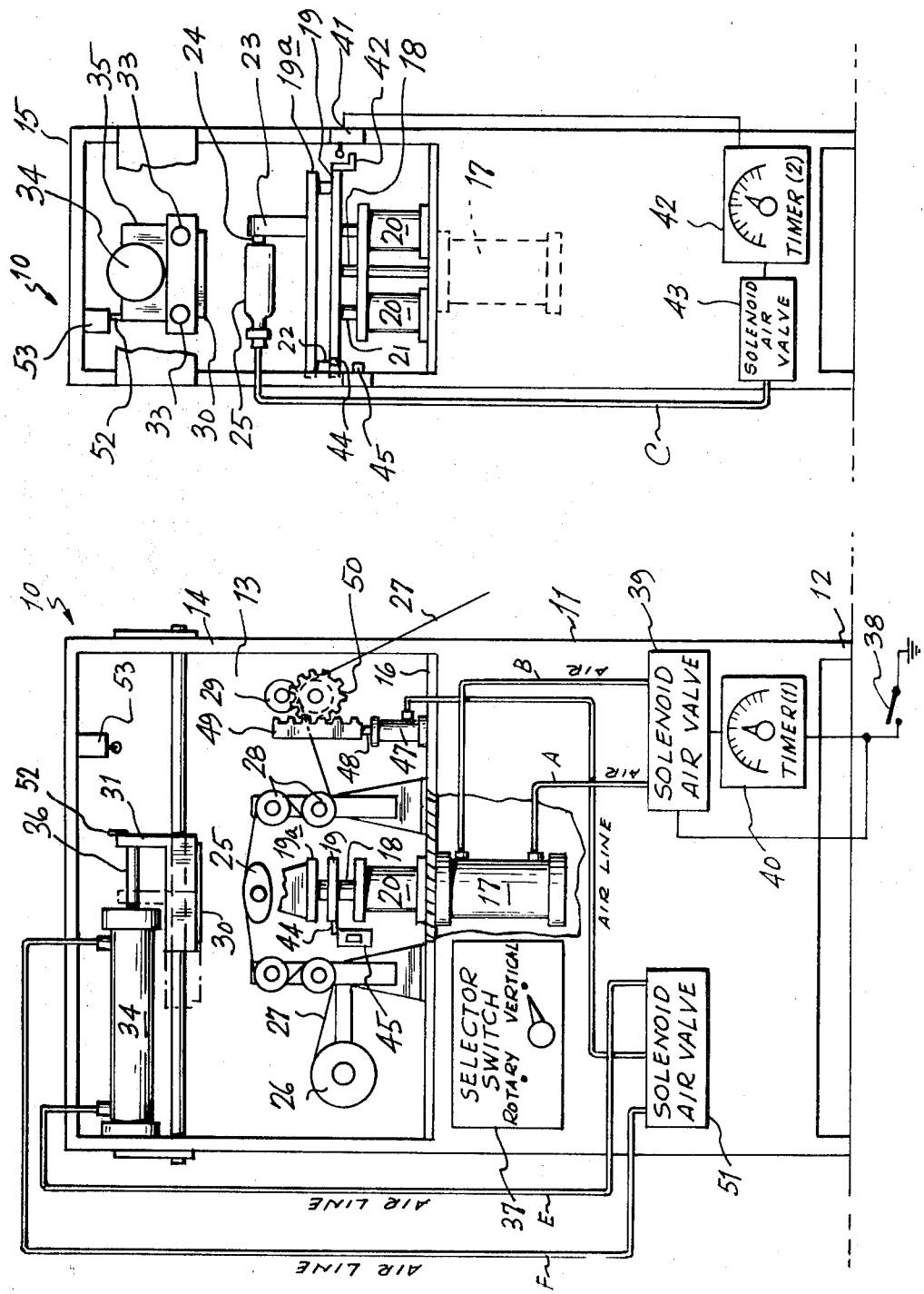
FIG. 5 is a front view of the rotary-vertical stamping machine showing an additional schematic of pneumatic and electrical circuitry.
FIG. 6 is a side view thereof.

For the purpose of illustrating the present invention, a specific type of hot stamping machine is disclosed. It should be understood, however, that the aspects of the present invention are applicable to various types of stamping machines well known to those skilled in the art, and it is not intended to limit the present invention to the specific type of machine illustrated.

Referring now to the drawings, there is illustrated a hot stamping machine generally designated at 10. The housing 11 for the machine is preferably formed of a heavy gauge metal, however, any known material can be used. The machine can be raised off the floor by means of legs 12 or the machine can rest flat on the floor. In either case the machine is firmly anchored to preclude lateral movement of the latter.

The work area 13 is an open area extending from front to rear of the machine and is defined by the side rails 14, a top rail 15 and a rigid horizontal bed 16. Securely fastened to the bed 16 is an air cylinder 17 which is supplied by an outside source (not shown) with air under pressure. The air cylinder 17 has a diaphragm therein (not shown) and air can be fed into the cylinder either above or below the diaphragm. A shaft 18 extends out of the cylinder 17 and is rigidly fixed to the diaphragm. Thus, as the diaphragm moves in an upward or downward direction, the shaft 18 moves correspondingly therewith.

The end of the shaft 18 is fixed to a platform 19 which is constrained to move in a vertical direction only corresponding to movement of the shaft 18. A pair of elevator guides 20 having longitudinal bores therein for the reception of a shaft 21 are provided to supply rigidity and stability to the platform 19, 19a. The shafts 21 are free to move in their respective bores and are designed to have a close-sliding fit. By utilizing these elevator guides, the platform 19 is firmly constrained to vertical movement without any lateral rocking of the platform. The platform 19 can include an upper part 19a rigidly held to the lower part 19 by posts or it can be a unitary platform.

Mounted on top of and securely fastened thereto is a housing 23 which can have gears therein. An arm 24 which can be in the form of a mandrel is rotatably secured to the housing 23 whereby the arm is free to rotate or it can be positively driven through a gear arrangement within the housing 23. The object 25 to be decorated is placed on the mandrel 24 such that it can be either rotated or held stationary thereon.

A reel 26 is rotatably mounted on the housing 10 and a tape 27 is wound on the reel. The tape is preferably Mylar having a foil thereon which is to be transferred in the form of a decorative design to the object 25. The tape 27 is passed over a plurality of tape guides 28. Four guides are shown, however, the number used is a matter of choice. The guides 28 are preferably rollers having a low coefficient of friction and having flanged ends to prevent the tape from moving laterally from the roller. The tape 27 is threaded around the left set of guides 28 as illustrated in FIG. 1 and thence between the object 25 and a die 30 where it is subsequently passed over the right set of guides. The tape 27 is then fed between a pair of pull rollers 29. These rollers have a surface thereon having a relatively high coefficient of friction or any type of known surface which will grip the tape, for example, a knurled surface can be applied to the rollers. The rollers 29 are rotatably mounted on the housing 10 and can be driven by a motor (not shown) or they can be actuated by hand to advance the tape 28 after the foil carried by the tape has been transferred to the object 25. Thus, by rotating one or both of the rollers 29, a positive grip is exerted on the tape 27 and it is pulled to the right as shown in FIG. 1 so that a fresh portion of tape having foil thereon is placed between the object 25 and the die 30 for each new object placed on the mandrel 24.

The die 30 can have a design etched thereon or it can be plain according to the desires of the user and depending upon how he wishes to decorate the object 25. The die 30 is fixed to a carriage 31 having openings 32 bored therein for the reception of a pair of guide rails 33. The carriage 31 is freely slidable on the guide rails 33 under the influence of an air cylinder 34 or any other motor means. An arm 35 is fixed at one end thereof to the carriage 31 and at its opposite end to a rod 36. A piston in the air cylinder 34 is fixed to the rod 36 and under the influence of air pressure the rod 36 is moved to the right as shown in FIG. 5; thus, the die is moved therewith to contact the tape 27 and the object 25. The die 30 is preferably heated by electrical means (not shown) and by applying heat and pressure to the tape and the object, the foil on the tape can be transferred to the object.

It should be pointed out at this point that different techniques are required for transferring foil to objects and the desired technique is dictated by the configuration of the object to be decorated. For example, when a perfectly circular object is to be decorated then one can decorate such an object by using "rotary" stamping. In rotary stamping, the die 30 which is fixed to a carriage 31 is moved laterally such that the right end of the die 30 initially contacts the tape 27 and the object 25 and through further lateral movement of the die 30, the object is rotated clockwise and the foil on the tape 27 is transferred to the object 25 through the application of heat and pressure to the tape 27 and the object 25.

On the other hand, when an object to be decorated is not round, but is more elliptical or flat in cross section then another technique must be employed, because the die 30 cannot rotate such an irregular shape. When such an object is to be decorated, a technique called "vertical" stamping must be employed. In utilizing this technique, the object is held stationary in a fixture and if a resilient or pliable object is to be decorated it is filled with air to give it resistance to the pressure applied to it and thereby prevent it from collapsing. An air cylinder moves the work vertically into a heated die and bears on the die so as to create the desired pressure. The foil on the tape 27 is thereby transferred to the object 25. Separate machines have always been necessary in the prior art to carry out either "vertical" or "rotary" stamping.

In FIG. 5 there is illustrated a combined vertical and rotary stamping machine. A selector switch 37 permits an operator to choose the type of stamping he desires to be accomplished. By rotating the switch 37 to "vertical" indicia, the machine is programmed to handle a vertical operation. A second switch 38, which can be a foot switch energizes a solenoid 39 which controls an air valve (not shown) which diverts pressurized air into air trunkline A. Air line A leads into the air cylinder 17 to a point below the diaphragm or piston (not shown) in the air cylinder. The piston is thereby driven upwards carrying with it the platform 19 and the object 25 which was previously mounted on a mandrel. The switch 38 also actuates a timer 40, which is a part well known in the art, and the details of its construction are not part of this invention, so further amplification is not deemed necessary. The timer then initiates the measurement of an interval of time, which has been preprogrammed into the timer, at the end of the period of time, the solenoid is actuated by the timer 40 so as to send pressurized air into trunkline B, which enters the opposite end of the piston than line A. This has the effect of driving the piston down and concomitantly therewith, the platforms 19 and the object 25.

During the upward travel of the platform 19, a switch 41, which can be a microswitch, is actuated by a tang 42 protruding from the platform 19. The switch 41 signals a second timer 42 which energizes a solenoid 43 which in turn opens an air valve to air line C. Air line C leads into a resilient object 25 which can be plastic, and inflates the object with air under pressure to rigidify the object enabling it to receive the pressure necessary for decorating it. At the end of a predetermined interval of time, the timer actuates the solenoid 43 to shut off the supply of air. This shutoff point occurs immediately after the foil has been transferred to the object 25.

After the foil has been transferred to the object 25 by the die 30 which was heated, and the inflated object was pressed against the die 30 under pressure, the time 40 actuates the solenoid 39 which opens air line B and closes air line A. Air in line A under pressure forces the platform 19 and the object 25 down away from the die 30.

When solenoid platform 19 is returned by air cylinder 20, a tang 44 on the platform 19 actuates a switch such as a microswitch 45. The switch 45 then actuates the solenoid 46 which in turn diverts air through a valve to air line D. Air under pressure is passed into cylinder 47 having a piston (not shown) therein. Attached to the piston rod 48 is a rack gear 49 which drives a pinion gear 50 on one of the pull rollers 29. When the air cylinder 47 is actuated, the rack gear 49 drives the roller 29 which because of its gripping relationship with the tape 27, pulls the tape 27 a predetermined distance, thereby advancing the tape to a fresh foil position where it is available to be transferred to another object 25. A spring (not shown) in the air cylinder or a spring bearing against the rack 49 or air pressure can return the rack gear to its rest position. A one-way clutch or a ratchet and pawl mechanism (not shown) permit only one-way rotation of the rollers 29.

When the operator desires to utilize a "rotary" stamping operation, he moves the switch 37 to the "rotary" position as shown in FIG. 3. Upon actuation of the foot switch 38, the solenoid 29 is actuated which opens air valve to supply air through trunk line A which feeds pressurized air to the air cylinder. The piston therein then forces the platform 19 upwardly to a point where the object 25 lies in the path of the horizontal travel of the carriage 31 and the die 30. When the selector switch is in the "rotary" position, the tang 42 on the platform actuates the switch 41 which permits the solenoid 51 to open an air valve to supply pressurized air through air line E into the air cylinder 34.

The piston in the air cylinder then drives the carriage by means of the piston rod 36 to the right as shown in FIG. 3. The die 30 contacts the tape 27 and the object 25 and since the object is rotatably mounted on a mandrel 24, the die 30 will rotate the object or it can be mechanically linked to the carriage to rotate it as it presses the tape 27 firmly against the object. Heat is electrically applied to the die 30 when the switch 41 is tripped or it can be supplied to the die 30 through the foot switch 38 and kept hot continuously. When the carriage 31 reaches the end of its travel an abutment 52 thereon actuates a switch which can be a microswitch 53 which permits a current to flow to the solenoid 39. The solenoid 39 opens an air valve to air line B supplying pressurized air to the air cylinder 17 and the platform 19 and the object 25, which has now been decorated with foil, are lowered away from the tape 27. As the platform 19 is lowered, the tang 44 on the platform actuates the switch which can be a microswitch 45, which, in the "rotary" position shown on the selector switch 37 actuates the solenoid 51. The solenoid 51 opens an air valve sending pressurized air through air line F which forces the piston and piston rod 36 to the left as shown in FIG. 3, and returns the carriage 31 and the die 30 therewith. The tape can be advanced for the next stamping operation by any mechanical or electrical linkage which can be actuated by the carriage. An example of a mechanical linkage is depicted in my U.S. Pat. No. 3,309,256 entitled "APPARATUS FOR SURFACE DECORATING OF ARTICLE" which issued on Mar. 14, 1967. The carriage could also actuate a switch sending current to a small motor which turns the roller 29 a predetermined proper amount.

What is claimed is:

1. In a machine for applying a decorative material to an object comprising,
   a. a base comprising a frame defining an open work area,
   b. elevator means on the base to raise and lower an object-holding member into the work area,
   c. means to reciprocally move a die mounted on the frame for movement in the work area,
   d. decorative means on the base located between said object and said die whereby the latter can be impressed upon the surface of the object,
   e. means on said base for
      i) selectively maintaining said die fixed in axial alignment with the elevator and spaced from said object such that the elevator urges the object into a pressurized engagement with said die, and ii. for moving said die longitudinally past the longitudinal axis of the elevator whereby the die engages the object and applies pressure thereto as it traverses the object.

2. In a machine for applying a decorative material to an object as defined in claim 1 in which said elevator means comprises a cylinder adapted to be filled with pressurized air, a piston in said air cylinder, and a piston road on said cylinder fixed to a platform whereupon movement of said piston in response to the pressurized air moves said platform up and down.

3. In a machine for applying a decorative material to an object as defined in claim 1 in which the decorative means comprises tape having a foil releasably secured thereto, in which the tape is on a supply reel fixed to said base, said tape is threaded through a plurality of guides on said base such that the tape passes between the die and the object.

4. In a machine for applying a decorative material to an object as defined in claim 3 further comprising a pair of rollers having a friction surface thereon which grips the tape and can move the tape.

5. In a machine for applying a decorative material to an object as defined in claim 4 further comprising means to rotate said rollers in response to movement of said platform.

6. In a machine for applying a decorative material as defined in claim 1 further comprising means to laterally move said decorative means in response to movement of said elevator means.

7. In a machine for applying a decorative material as defined in claim 1 further comprising air supply means on said base to inject air into said object whereby said object will not materially deform when pressure is applied thereto.

8. In a machine for applying a decorative material as defined in claim 1 in which said means on the base for selectively maintaining said die fixed and for moving said die comprises an electrical circuit which operates valve members to open and close pressure lines leading to said elevator means and to said means to move said die, and a selector switch which selects a "rotary" or "vertical" operation.

9. In a machine for applying a decorative material as defined in claim 8 in which the pressure lines are tubular members which carry air under pressure to said elevator means and to said means to move said die.

10. In a machine for applying a decorative material to an object as defined in claim 5 in which said means to rotate said rollers comprise a gear on at least one roller and a rack gear engaging said gear for movement therewith and an air cylinder fixed to said rack gear and adapted to move said rack gear in response to air pressure applied thereto.

11. In a machine for applying a decorative material as defined in claim 8 further comprising a timing means which controls the time interval during which the elevator is raised.

12. In a machine for applying a decorative material as defined in claim 7 in which a timing means controls the time interval during which pressurized air is maintained in said object.

13. In a machine for applying a decorative material as defined in claim 8 in which said means on the base for selectively maintaining said die fixed and for moving said die further comprises switch means in said electrical circuit.

14. In a machine for applying a decorative material as defined in claim 13 in which a tang on the elevator means actuates said switch means which signals air valve means thereby supplying pressurized air to move said decorative means when said selector switch is in the "vertical" position.

15. In a machine for applying a decorative material as defined in claim 13 in which a tang on the elevator means actuates said switch means which signals air valve means thereby supplying pressurized air to said die reciprocating means to reciprocate the die when said selector switch is in the "rotary" position.

16. In a machine for applying a decorative material as defined in claim 13 in which an abutment on the die reciprocating means actuates a switch at the end of its movement in one direction which signals air valve means thereby supplying pressurized air to move said elevator means when said selector switch is in the "rotary" position.

* * * * *